No. 786,628.                                              Patented April 4, 1905.

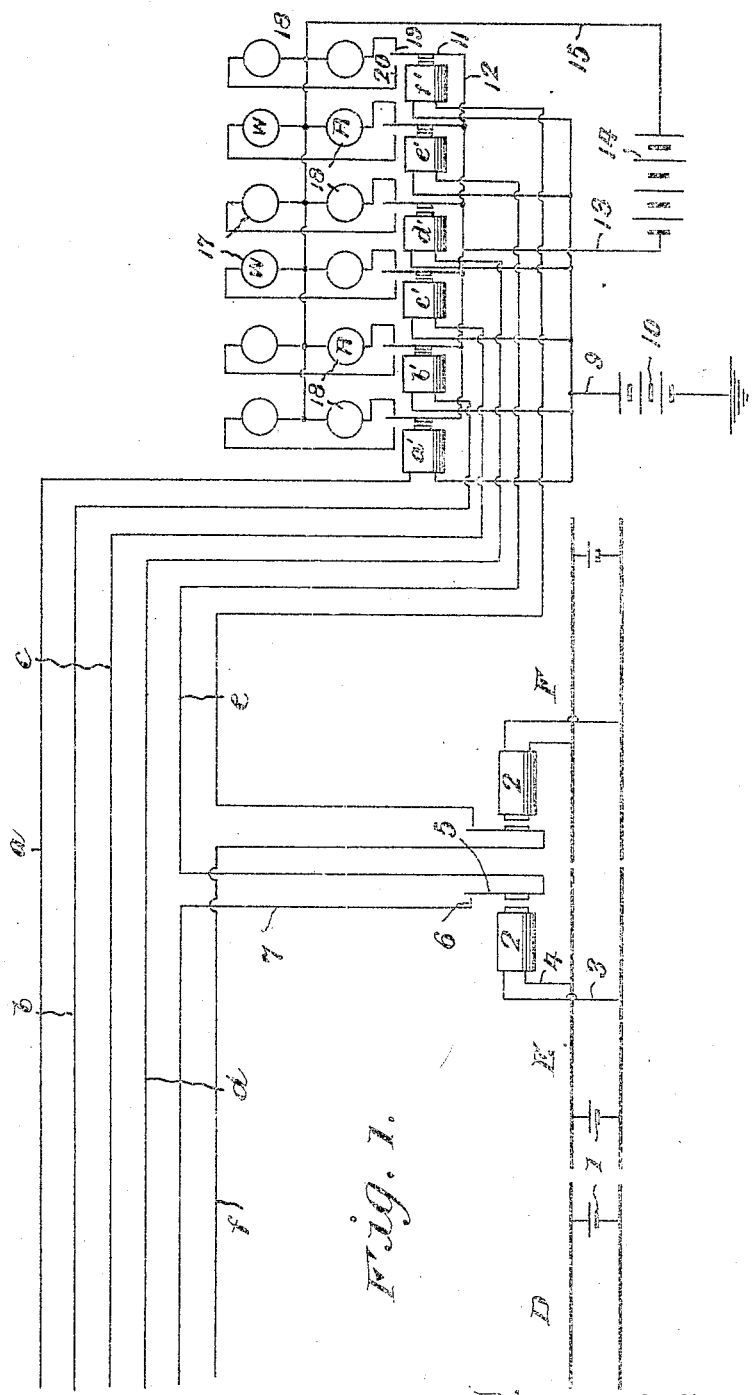

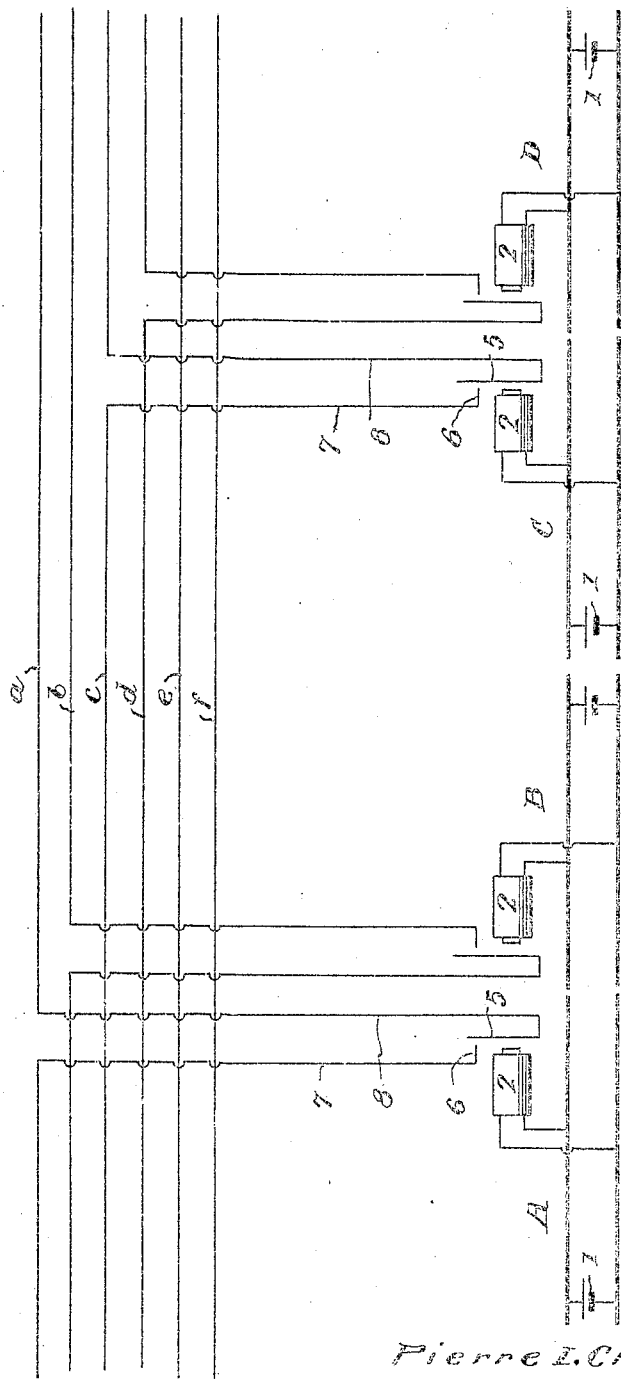

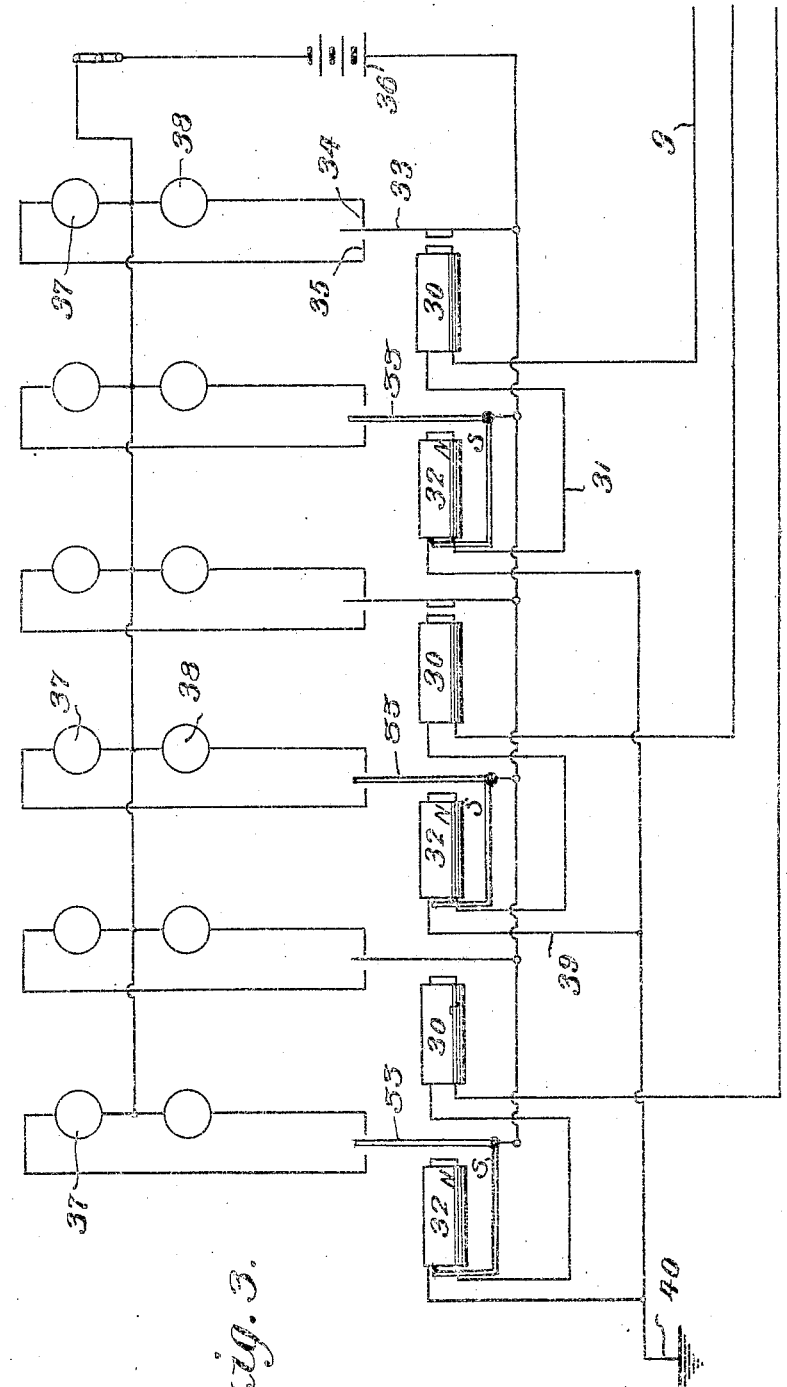

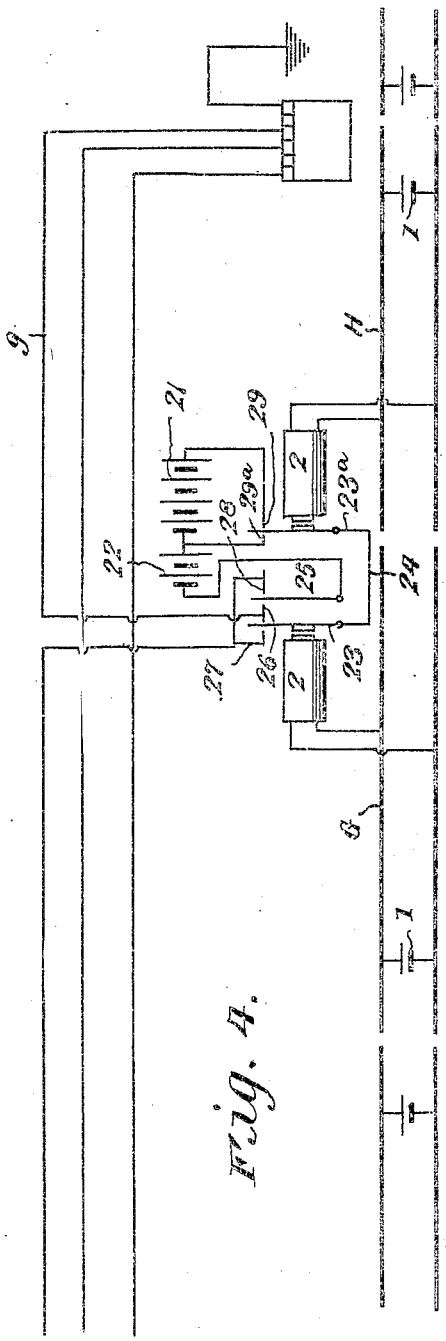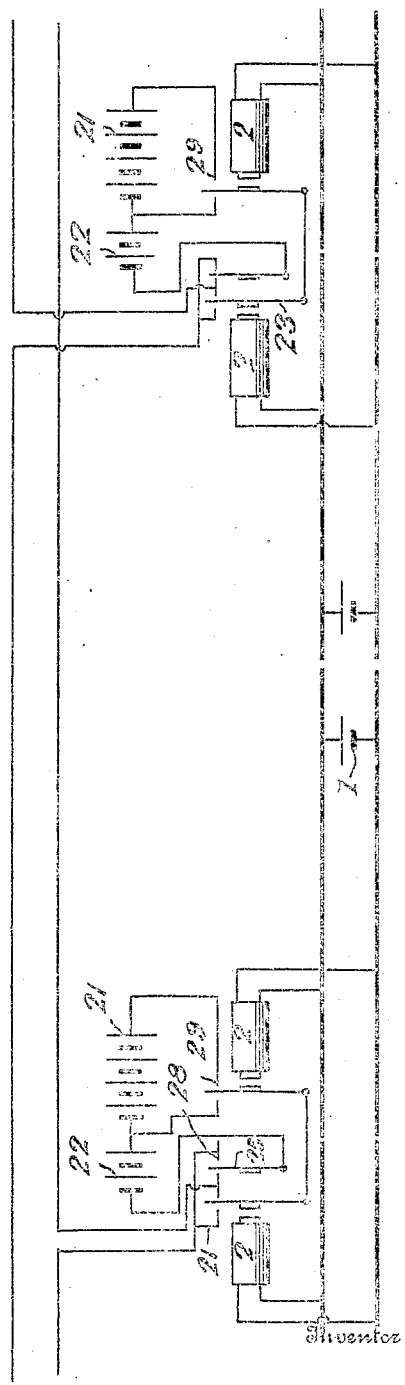

UNITED STATES PATENT OFFICE.

PIERRE I. CHANDEYSSON, OF NORTH JUDSON, INDIANA, ASSIGNOR, BY MESNE ASSIGNMENTS, TO ROBERT D. PETERS, OF KNOX, INDIANA.

ELECTRIC INDICATOR FOR RAILWAYS.

SPECIFICATION forming part of Letters Patent No. 786,628, dated April 4, 1905.

Application filed February 13, 1904. Serial No. 193,456.

*To all whom it may concern:*

Be it known that I, PIERRE I. CHANDEYSSON, a citizen of the United States, residing at North Judson, in the county of Starke and State of Indiana, have invented new and useful Improvements in Electric Indicators for Railways, of which the following is a specification.

My invention relates to new and useful improvements in electric indicators for railways; and its object is to provide a system whereby persons located at any stations along the railway can promptly and accurately determine the exact location of one or more trains between the stations.

A further object is to provide a system which will automatically indicate the progress of the train or trains and their direction and exact location at any time and which will warn the persons at the stations of any break in the track or of any obstruction which may be placed thereon.

With the above objects in view the invention consists of an indicator adapted to be arranged in each station and having electrical connection with each block of the series into which the track between the stations is divided.

The invention also consists of a series of indicators adapted to be automatically placed in circuit with a source of electricity whenever the current, which normally passes through the rails of each block to a relay, is short-circuited by a train of obstruction or whenever one or more of the rails included within the block is removed or broken.

The invention also consists of a series of these indicators, one being provided for each block, so that the exact location of the train or obstruction, together with the progress of the train, can be accurately indicated at either of the stations connected by the system.

The invention also consists in the further novel construction and combination of parts hereinafter more fully described and claimed, and illustrated in the accompanying drawings, showing the preferred form of my invention, and in which—

Figure 1 is a diagrammatical view showing an indicator adapted to be placed in the station at one end of the system and also showing its connection with two of the blocks. Fig. 2 is a similar view showing the manner of connecting the line-wires of the system with other blocks of the system. Fig. 3 is a diagrammatical view of the indicator used in connection with half as many line-wires as there are blocks. Fig. 4 is a diagrammatical view showing the indicator connected to two blocks of the system, and Fig. 5 is a similar view showing the manner of connecting two of the line-wires to four blocks of the system.

The track between two stations of the railway is adapted to be divided into blocks, which are insulated from each other, and the rails of each block are bound, so that a current of electricity is free to pass from one end to the other of each side of the block.

In Figs. 1 and 2 of the drawings I have shown a section of a railway divided into six blocks, which are indicated by the letters A, B, C, D, E, and F, and one line-wire is provided for each block. These wires I have indicated by the characters $a$, $b$, $c$, $d$, $e$, and $f$, respectively. Electrically connected with the rails of each block and at one end thereof is a battery 1, and a magnet 2 is electrically connected to the two rails at the other end of the block by means of wires 3 and 4. This magnet has an armature 5, which is adapted to bear upon a contact 6. The line-wire used in connection with the block of this contact 6 is broken adjacent the armature, and one end thereof is connected with the contact 6 by a wire 7, while the other end is connected by a wire 8 with the armature 5. As a magnet 2 of each block is normally energized by the current from the battery 1, it will be seen that armature 5 is normally electrically connected with the contact 6, and therefore currents can normally pass through all the line-wires by way of the armatures 5 and the contacts 6.

A series of magnets $a'$, $b'$, $c'$, $d'$, $e'$, and $f'$ is arranged at each end of the system, and these two series are connected to the line-wires A, B, C, D, E, and F, respectively, and with a common ground-wire 9, electrically connected to a battery 10 or other source of electricity. Each magnet has an armature 11, electrically connected by wires 12 and 13 with a source 14 of electricity, and a wire 15 extends from this source and is electrically connected with oppositely-disposed lamps 17 and 18. Contacts 19 and 20 are arranged at opposite sides of each armature 11, and the contacts 19 are electrically connected to the lamps 18, while contacts 20 are similarly connected to the lamps 17. One lamp 17 and one lamp 18 is provided for each armature, and it will therefore be seen that the number of lamps 17 and of lamps 18 is equal to the number of blocks. As the armatures 5 normally bear on the contacts 6, a circuit is normally established from the source 10 through the magnets $a'$, $b'$, $c'$, $d'$, $e'$, and $f'$ and through their respective line-wires, and therefore armatures 11 are held normally in position upon the contacts 20, thus establishing a circuit from the source 14 through the wires 13 and 12, the armatures 11, and the contacts 20 to lamps 17, and from these lamps through wire 15 to the source. It will thus be seen that the lamps 17 will be normally lighted.

A train in leaving one station and moving upon the tracks of the block A will promptly short-circuit the current from the battery 1 of said block, and therefore the armature of the magnet 2, connected to said block, will be released and will automatically break its connection with its contact 6. The current through the line-wire $a$, extending from said block, will thus be broken, and its magnet $a'$ will be deënergized and release its armature 11, thereby breaking the circuit from the source 14 to the lamp 17, connected to the line-wire $a$, and establishing a circuit through the lamp 18 of said line-wire from the source 14 through wire 15, contact 19, and wires 12 and 13. The same result will occur in the event of the placing of an obstruction upon the track of said block which would tend to short-circuit the current from the battery 1 and also by the breaking of the circuit from battery 1 through the removal or break of one or more of the rails included within the block. When a moving train leaves the block A and passes onto the adjoining block B, the lamp 18 of the two blocks will both be lighted simultaneously for the short period during which the train is upon the two blocks. When, however, the train passes entirely upon the block B, the three circuits—to wit, that through the magnet 2, through the magnet $a'$, and through the lamp 17, connected to the magnet $a'$—will be reëstablished. It will thus be seen that persons stationed adjacent the indicator can readily determine the exact location of a train as it moves from one block to another of the system, and by simple methods of calculation the speed of the train can be determined as well as the nature thereof. For instance, by comparing the length of the block with the time required for the train to pass thereover the speed can be readily determined, and by taking into consideration the speed of the train and the time required in its passage from one block to the other the length of the train can be readily calculated. The lamps 17 and 18 may be placed in a suitable casing provided therefor, and the lamps 17 are preferably white, while the lamps 18 may be red or any other desired color.

While I have in Figs. 1 and 2 shown a system in which one line-wire is employed for each block, I may, if desired, utilize a modified system in which one-half as many line-wires may be used as there are blocks. I have shown this modification in Figs. 3, 4, and 5, which represent the indicator connected by three line-wires with six blocks. With this modified arrangement two connected sources 21 and 22 of electricity are provided for every two blocks and adjacent the adjoining ends of said blocks. The batteries 1 and magnets 2 are the same in this modified form as in the form heretofore described; but the armatures 23 and $23^a$ of the two magnets are electrically connected by a wire 24. An armature 25 is arranged adjacent and is adapted to move with the armature 23, and a contact 26 is interposed between the armatures 23 and 25, and contacts 27 and 28 are arranged at opposite sides of said armatures. The line-wire used in connection with the two blocks is broken adjacent the magnets 2 thereof, and one end is connected to the contacts 27 and 28, while the other end is connected to the contact 26. The sources 21 and 22 are electrically connected to armature 25 and to a contact 29, arranged at one side of the armature $23^a$. A second contact $29^a$ is located at the other side of the armature $23^a$ and is electrically connected to the two sources 21 and 22 at a point therebetween. The line-wire extending from two adjoining blocks G and H of this modified system extends to an indicator which is arranged in one or both of the stations at the ends of the system and is electrically connected to a neutral magnet 30, which in turn is electrically connected by a wire 31 with a polarized relay 32, the north and south poles of which are indicated, respectively, by the characters N and S. Each line-wire of this system is connected in the same manner to two magnets, and each of the magnets has an armature 33 provided at opposite sides with contacts 34 and 35. A source 36 of electricity is electrically connected to all of the armatures 33 and to lamps 37 and 38. The lamps 38 are electrically connected to the contacts 34, while the lamps 37 are connected in the same manner to contacts 35. Wires 39 extend from the magnets to a ground-wire 40. In this modified system a circuit is normally established through the magnets 2, and therefore the armatures 23 and 25 are normally in position upon the contacts 27 and 26, respectively, and the armatures 23 are normally in position upon contacts 29. A circuit is thus established through each line-wire by way of contact 27, armature 23, wire 24, armature 23$^a$, sources 21 and 22, and armature 25, and therefore the armatures 33 are brought into position upon the contacts 35, so as to bring the lamp 37 normally in circuit with the source 36. When a train moves into position upon the block G, the magnet 2 connected thereto is promptly deënergized and the two armatures 23 and 25 move automatically into position upon the contacts 26 and 28, respectively. The circuit through the line-wire is thus promptly reversed and passes through the armature 25 and the sources 22 and 21 to armature 23$^a$ and thence to armature 23. The train upon passing onto the next block H will short-circuit the current produced by the source 1 therein and deënergize magnet 2 of said block H. A circuit will then be established through the line-wire by way of armature 25, contact 28, source 22, armature 23$^a$, armature 23, and contact 26. When the train leaves the block G and moves upon the block H, the current will again be reversed by passing from the line-wire through the contact 27, armature 23, wire 24, armature 23$^a$, source 22, armature 25, and contact 26. The current in these two last instances—to wit, that produced when the train is upon the two blocks simultaneously and that produced when the train is entirely upon the block H—is less than the current produced when the train is on the block G. By this arrangement of circuits and the neutral and polarized magnets 30 and 32 it will be seen that the lamps 38 will be successively lighted as a train passes from one block to another, and the location of the train can thus be accurately determined at any time.

While I have shown the use of lamps in connection with the indicator, it is to be understood that any form of indicator, either visual or auditory, may be substituted therefor.

An apparatus such as herein described is especially serviceable upon railways containing a single track.

The apparatus herein described is separate from any train signaling apparatus which might be employed and is of especial advantage to train-dispatchers, telegraph operators, and other persons whose duty it is to keep advised of the movement of the trains under their control.

In the foregoing description I have shown the preferred form of my invention; but I do not limit myself thereto, as I am aware that modifications may be made therein without departing from the spirit or sacrificing any of the advantages thereof, and I therefore reserve the right to make such changes as fairly fall within the scope of my invention.

Having thus described the invention, what is claimed as new is—

1. The combination with rails insulated from each other and forming blocks, each block being provided with a source of electricity, and a relay electrically connected with the rails of each block; of source of electricity, electrically-connected armatures to the relays, contacts therefor, electrical connections between the contacts and the sources of electricity, magnets, electrical connections between two of said magnets and the contacts, said connections including the sources of electricity connected to the contacts, oppositely-disposed indicators, a source of electricity connected thereto, armatures for the magnets, contacts adapted to be alternately contacted thereby, and electrical connections between the indicators and the contacts.

2. The combination with a connected neutral and a polarized magnet; of armatures to the magnets, lamps, a source of electricity electrically connected to the lamps, means controlled by the armatures for directing a current from the source of electricity into either lamp, insulated rails forming blocks, each block being provided with a relay connected thereto and normally energized, a connection between the relays and the magnets, and means operated by the relays for successively operating the armatures of the magnets by a short-circuiting device upon the rails.

3. In an apparatus of the character described, the combination with a neutral and a polarized magnet electrically connected, a circuit, indicators included within the circuit, and armatures for the magnet adapted to direct a current into either of the indicators; of a line-wire connected to and in circuit with the magnets, insulated rails forming adjoining blocks, relays electrically connected to the blocks at adjoining ends thereof and having sources of electricity, electrically-connected armatures to the relays, contacts at opposite sides of one of the armatures and included within the line-wire, contacts at opposite sides of the other armature and electrically connected to a source of electricity, a third armature movable with one of the first-mentioned armatures and electrically connected to said source of electricity, and contacts at opposite sides of said armature and included within the line-wire, whereby a circuit is normally established through the line-wire and is automatically reversed by the breaking of the circuit of one of the relays.

4. The combination with rails, a circuit including indicators, a source of electricity, an armature, and oppositely-disposed contacts connected to the indicators respectively; of a magnet, a source of electricity connected thereto, a relay for closing the circuit between the magnet and its source of electricity, electrical connections between the relay and the rails, and a source of electricity connected to said rails.

In testimony whereof I affix my signature in presence of two witnesses.

PIERRE I. CHANDEYSSON.

Witnesses:
HJALMAR A. ELLINGSON,
JAMES C. FLETCHER.